United States Patent
Sakashita et al.

(10) Patent No.: US 10,783,761 B2
(45) Date of Patent: Sep. 22, 2020

(54) SURVEILLANCE TERMINAL APPARATUS, SURVEILLANCE SYSTEM, AND NON-TRANSITORY COMPUTER-READABLE RECORDING MEDIUM HAVING SURVEILLANCE DISPLAY CONTROL PROGRAM RECORDED THEREON

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 17 days.

(21) Appl. No.: 16/237,992

(22) Filed: Jan. 2, 2019

(65) Prior Publication Data
US 2019/0221091 A1 Jul. 18, 2019

(30) Foreign Application Priority Data
Jan. 12, 2018 (JP) .................................. 2018-003800

(51) Int. Cl.
*G08B 13/196* (2006.01)
*G06K 9/00* (2006.01)
*H04N 7/18* (2006.01)
*G11B 27/00* (2006.01)

(52) U.S. Cl.
CPC ... *G08B 13/19693* (2013.01); *G06K 9/00228* (2013.01); *G06K 9/00771* (2013.01); *G11B 27/005* (2013.01); *H04N 7/181* (2013.01)

(58) Field of Classification Search
USPC ........................................................ 386/223
See application file for complete search history.

(56) References Cited

U.S. PATENT DOCUMENTS

| | | | | |
|---|---|---|---|---|
| 2007/0126868 | A1* | 6/2007 | Kiyohara | ................ G06T 7/246 348/143 |
| 2008/0212099 | A1* | 9/2008 | Chen | ........................ G06T 7/20 356/408 |
| 2009/0244281 | A1* | 10/2009 | Hiromasa | .......... G08B 13/1961 348/143 |

FOREIGN PATENT DOCUMENTS

JP 2009-239467 A 10/2009

* cited by examiner

*Primary Examiner* — Loi H Tran
(74) *Attorney, Agent, or Firm* — IP Business Solutions, LLC

(57) ABSTRACT

A surveillance terminal apparatus includes a storage unit, a communication unit, a picture identifier, a reader, a facial recognition processor, a display unit, and a playback controller. The picture identifier identifies, as an entry picture and an exit picture, a part of the picture of a target person shot by an imaging device and stored in the storage unit. The facial recognition processor identifies both of the entry picture and the exit picture of the same target person, by performing facial recognition with respect to the entry picture and the exit picture read out by the reader. The playback controller changes playback times of the pictures corresponding to actual length of the pictures to the same playback time, when a difference between the playback times of the respective pictures exceeds a threshold, and causes the display unit to simultaneously play back both of the pictures side by side.

10 Claims, 11 Drawing Sheets

Fig.3

MANAGEMENT INFORMATION STORAGE TABLE

| CONTROL NUMBER | DETECTION TIMES | ENTRY/ EXIT FLAG | GATE NUMBER | PICTURE INDEX | GATE-PASS TIME | FACE-DETECTED PERSON NUMBER |
|---|---|---|---|---|---|---|
| 1 | T1: 08:30:12, T2: 08:30:22 | ENTRY | G1 | C1:08:30:12 | 10 SEC. | P001 |
| 2 | T1: 08:32:44, T2: 08:32:55 | ENTRY | G1 | C1:08:32:44 | 11 SEC. | P002~P005 |
| 3 | T2: 08:40:25, T1: 08:40:30 | EXIT | G1 | C2:08:40:25 | 5 SEC. | P001 |
| 4 | T6: 08:48:30, T5: 08:48:34 | EXIT | G3 | C6:08:48:30 | 4 SEC. | P002,P003 |
| 5 | T3: 08:49:50, T4: 08:50:05 | ENTRY | G2 | C3:08:49:50 | 15 SEC. | P006~P008 |
| 6 | T2: 08:51:01, T1: 08:51:08 | EXIT | G1 | C2:08:51:01 | 7 SEC. | P005 |
| 7 | T2: 08:51:41, T1: 08:51:49 | EXIT | G2 | C4:08:51:41 | 8 SEC. | P004 |

<WITHOUT BELONGINGS>

PLAYBACK TIME: ORIGINALLY 10 SECONDS ⇩
FIRST PLAYBACK TIME: 7 SECONDS

PLAYBACK TIME: ORIGINALLY 5 SECONDS ⇩
FIRST PLAYBACK TIME: 7 SECONDS

Fig.8
<WITH BELONGINGS>
PLAYBACK TIME: ORIGINALLY 10 SECONDS ⇩
SECOND PLAYBACK TIME: 9 SECONDS
PLAYBACK TIME: ORIGINALLY 5 SECONDS ⇩
SECOND PLAYBACK TIME: 9 SECONDS
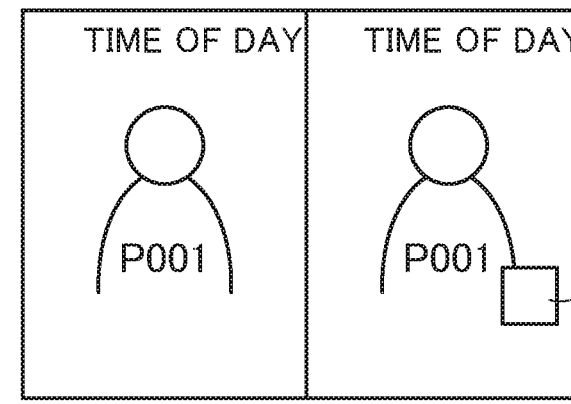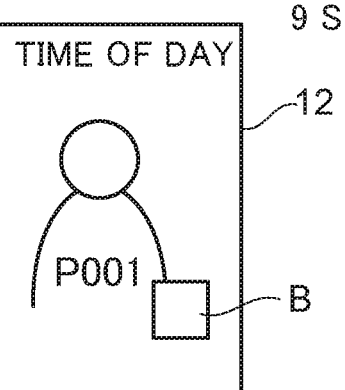
ENTRY PICTURE OF GATE 1    EXIT PICTURE OF GATE 1

<WHEN THREE PERSONS ENTERED TOGETHER,
AND EACH EXITED THROUGH DIFFERENT GATE>

SURVEILLANCE TERMINAL APPARATUS, SURVEILLANCE SYSTEM, AND NON-TRANSITORY COMPUTER-READABLE RECORDING MEDIUM HAVING SURVEILLANCE DISPLAY CONTROL PROGRAM RECORDED THEREON

INCORPORATION BY REFERENCE

This application claims priority to Japanese Patent Application No. 2018-003800 filed on Jan. 12, 2018, the entire contents of which are incorporated by reference herein.

BACKGROUND

The present disclosure relates to a surveillance terminal apparatus, a surveillance system, and a non-transitory computer-readable recording medium having a surveillance display control program recorded thereon, and more particularly to a technique to simultaneously play back a picture of a target person's entry and a picture of the target person's exit, locating the pictures side by side on a display unit.

Surveillance systems thus far developed to monitor entry and exit of persons to and from a building include one configured to display a picture shot by an imaging device installed at an entrance of the building, on a display unit. A surveillant views the picture on the display unit to confirm whether any irregularity is taking place. Now, there are cases where the surveillant wishes to compare, upon viewing an exit picture of a target person, between the entry picture and the exit picture of the target person. In such a case, the surveillant has to retrieve the entry picture of the target person from picture data stored in a storage unit, to have the entry picture displayed, which requires troublesome operation.

Normally, a surveillance system includes an identification information reading unit that reads identification information of an ID card owned by the target person, at the time of entry and exit of the target person, a storage unit for storing the identification information read and an entry picture in association with each other, and a control unit that acquires the entry picture of the target person from the storage unit on the basis of the identification information read when the target person exits, and plays back the entry picture acquired from the storage unit and an exit picture shot when the target person exits side by side, on a display unit. Such a configuration eliminates the need for the surveillant to retrieve the entry picture shot in the past, and allows the entry picture and the exit picture of the target person to be played back side by side on the display unit, thereby enabling the surveillant to visually compare between the entry picture and the exit picture.

SUMMARY

The disclosure proposes further improvement of the foregoing technique.

In an aspect, the disclosure provides a surveillance terminal apparatus including a storage unit, a communication unit, a picture identifier, a reader, a facial recognition processor, a display unit, and a playback controller. The storage unit stores therein a picture of a gate through which a target person passes when entering or exiting, the picture having been shot by an imaging device. The communication unit receives output information from an entry/exit detection device that detects entry and exit of the target person. The picture identifier identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device received by the communication unit. The reader reads out the entry picture and the exit picture identified by the picture identifier, from the storage unit. The facial recognition processor identifies both of the entry picture and the exit picture of the same target person, by performing facial recognition with respect to the entry picture and the exit picture read out by the reader. The playback controller changes a playback time of both of the pictures identified by the facial recognition processor to a same playback time, the playback time being an actual length of the pictures, when a difference between the playback times of the respective pictures exceeds a threshold, and causes the display unit to simultaneously play back both of the pictures side by side.

In another aspect, the disclosure provides a surveillance system including an imaging device, an entry/exit detection device, and a surveillance terminal apparatus. The imaging device shoots a gate through which a target person passes when entering or exiting. The entry/exit detection device detects entry and exit of the target person. The surveillance terminal apparatus causes a display unit to display a picture of the target person shot by the imaging device. The surveillance terminal apparatus includes a storage unit, a communication unit, a picture identifier, a reader, a facial recognition processor, and a playback controller. The storage unit stores therein a picture shot by the imaging device. The communication unit receives output information from the entry/exit detection device. The picture identifier identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device received by the communication unit. The reader reads out the entry picture and the exit picture identified by the picture identifier, from the storage unit. The facial recognition processor identifies both of the entry picture and the exit picture of the same target person, by performing facial recognition with respect to the entry picture and the exit picture read out by the reader. The playback controller changes a playback time of both of the pictures identified by the facial recognition processor to a same playback time, the playback time being an actual length of the pictures, when a difference between the playback times of the respective pictures exceeds a threshold, and causes the display unit to simultaneously play back both of the pictures side by side.

In still another aspect, the disclosure provides a non-transitory computer-readable recording medium having a surveillance display control program recorded thereon, the surveillance display control program being configured to cause a computer including a processor to act, when the processor executes the surveillance display control program, as a control unit, a picture identifier, a reader, a facial recognition processor, and a playback controller. The control unit stores, in a storage unit, a picture of a gate through which a target person passes when entering or exiting, the picture having been shot by an imaging device. The picture identifier identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device. The reader reads out the entry picture and the exit picture identified by the picture identifier, from the storage unit. The facial recognition processor identifies both of the entry picture and the exit picture of the same target person, by performing facial recognition with respect to the entry picture and the exit picture read out by the reader. The playback controller changes a playback time of both of the pictures identified by the facial recognition processor to a same playback time, the playback time being an actual length of the pictures, when a difference between the playback times of the respective pictures exceeds a threshold, and causes the display unit to simultaneously play back both of the pictures side by side.

BRIEF DESCRIPTION OF THE DRAWINGS

FIG. 3 represents an example of a management information storage table for recording management information, such as the entry and exit history of a target person and picture indices;

FIG. 8 is a schematic drawing showing an entry picture and an exit picture of the same target person, simultaneously played back side by side, when the target person is carrying belongings;

DETAILED DESCRIPTION

Hereafter, a surveillance system and a surveillance terminal apparatus according to an embodiment of the disclosure will be described in detail, with reference to the drawings.

Figure 1:
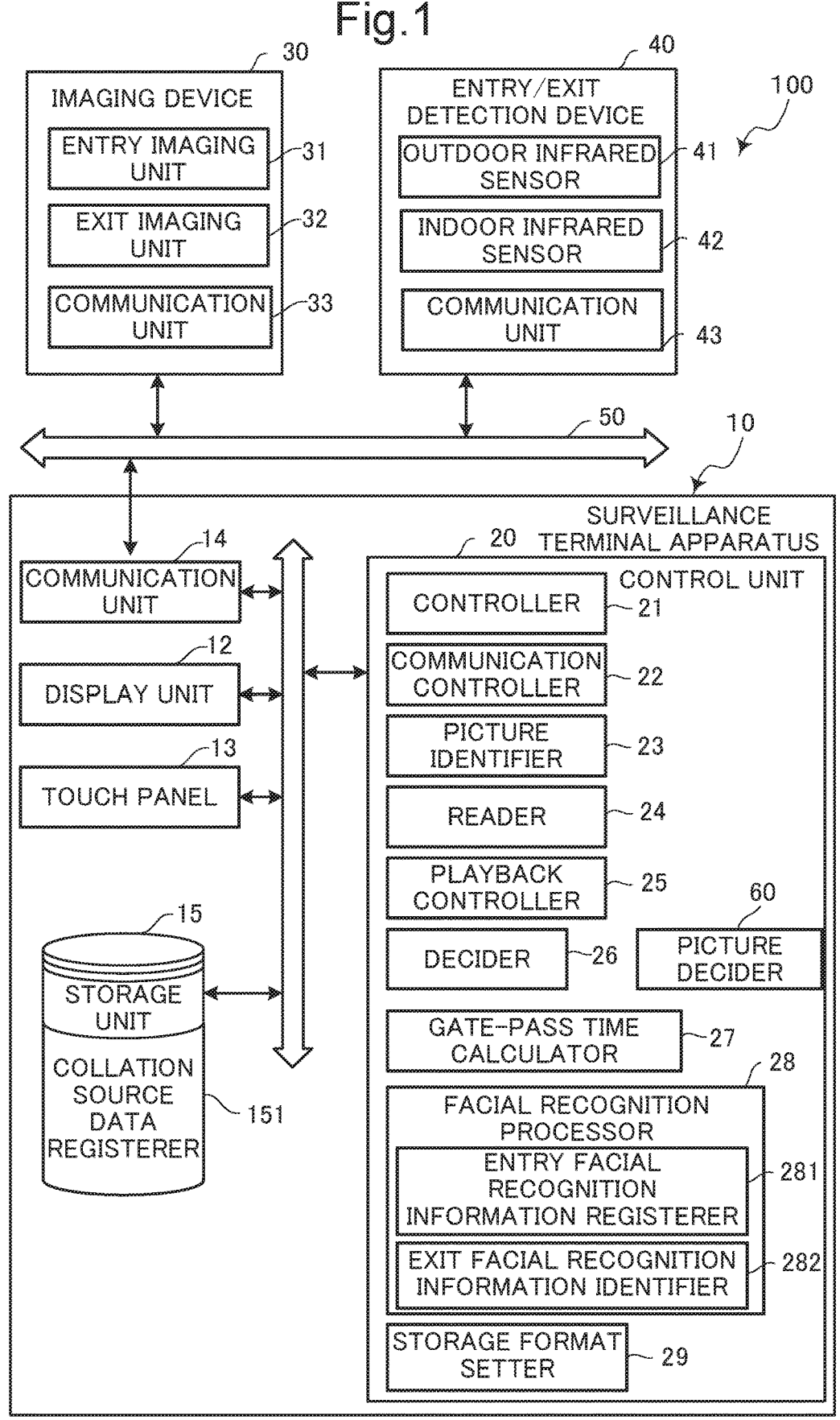
FIG. 1 is a block diagram showing a configuration of a surveillance system according to an embodiment of the disclosure.
Figure 2:
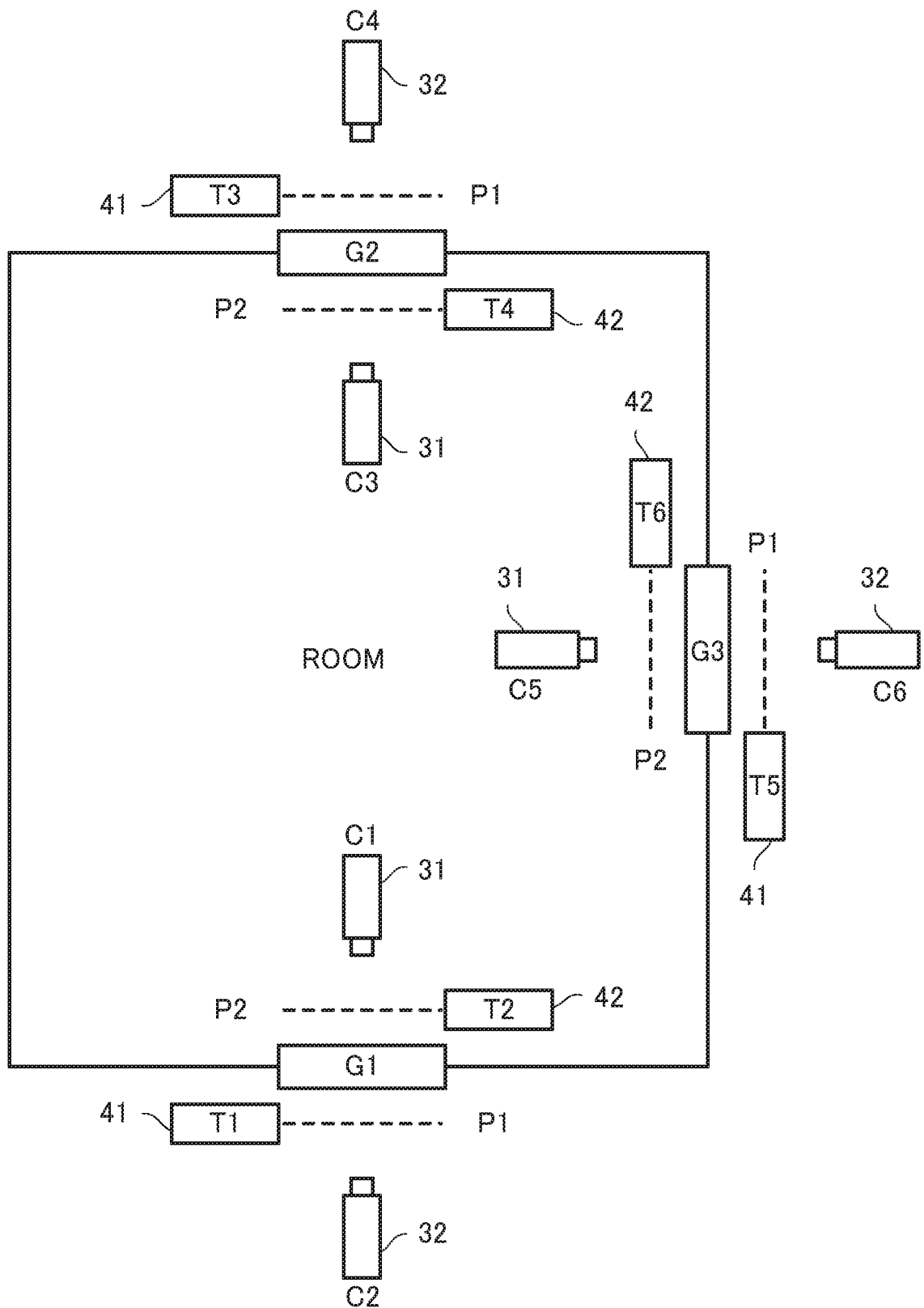
FIG. 2 is a schematic drawing showing an arrangement of monitoring positions in the surveillance system according to the embodiment.

FIG. 1 is a block diagram showing a configuration of the surveillance system according to the embodiment of the disclosure. FIG. 2 is a schematic drawing showing an arrangement of monitoring positions in the surveillance system according to the embodiment.

The surveillance system 100 according to this embodiment, applicable for surveillance of entry and exit of persons to and from a building such as a store or a facility, includes a surveillance terminal apparatus 10, an imaging device 30, and an entry/exit detection device 40. The imaging device 30 and the entry/exit detection device 40 are connected to the surveillance terminal apparatus 10 via a network 50. The surveillance system 100 according to this embodiment monitors the entry and exit of persons through gates G1 to G3 which are, for example, automatic doors respectively located at three positions of the store.

As shown in FIG. 2, the imaging device 30 and the entry/exit detection device 40 are provided at each of the gates G1 to G3 of the store. The following description will primarily focus on the imaging device 30 and the entry/exit detection device 40 provided at the gate G1. The imaging device 30 and the entry/exit detection device 40 provided at the gates G2 and G3 are basically the same as those of the gate G1, and therefore differences therefrom will be described, where appropriate.

The imaging device 30 of the gate G1 includes an entry imaging unit 31 that shoots an entry picture of a target person entering through the gate G1, and an exit imaging unit 32 that shoots an exit picture of the target person leaving through the gate G1, each serving as a surveillance camera that shoots the gate G1 through which the target person passes when entering or exiting. The imaging device 30 of the gate G1 also includes a communication unit 33 that transmits the picture shot by the entry imaging unit 31 or the exit imaging unit 32, to the surveillance terminal apparatus 10. The communication unit 33 is a communication interface including a communication module such as a non-illustrated LAN chip. The entry imaging unit 31 of the gate G1 possesses identification information C1, for the surveillance terminal apparatus 10 to identify the picture from the entry imaging unit 31 of the gate G1. The exit imaging unit 32 of the gate G1 also possesses identification information C2, for the surveillance terminal apparatus 10 to identify the picture from the exit imaging unit 32 of the gate G1. Likewise, the entry imaging unit 31 and the exit imaging unit 32 of the gates G2 and G3 also possess identification information C3 to C6.

The entry imaging unit 31 and the exit imaging unit 32 of the gate G1 each include a real time clock (RTC). The entry imaging unit 31 of the gate G1 outputs picture data in which a shooting time of the RTC (time code) and the identification information C1 are associated with the picture that has been shot, to the communication unit 33. The exit imaging unit 32 of the gate G1 outputs picture data in which a shooting time of the RTC (time code) and the identification information C2 are associated with the picture that has been shot, to the communication unit 33. The communication unit 33 transmits the picture data from the entry imaging unit 31 and the exit imaging unit 32 to the surveillance terminal apparatus 10, through the network 50.

The entry/exit detection device 40 of the gate G1 detects the entry and exit of the target person through the gate G1. To be more detailed, the entry/exit detection device 40 of the gate G1 includes an outer infrared sensor 41 (first detection unit) that detects the target person located at a position P1 on the outer side of the gate G1, an inner infrared sensor 42 (second detection unit) that detects the target person located at a position P2 on the inner side of the gate G1, and a communication unit 43 that transmits output information including detection time information indicating the detection time of the outer infrared sensor 41 and the inner infrared sensor 42, to the surveillance terminal apparatus 10. The communication unit 43 is a communication interface including a communication module such as a non-illustrated LAN chip. The outer infrared sensor 41 of the gate G1 possesses identification information T1, for the surveillance terminal apparatus 10 to identify the detection time information from the outer infrared sensor 41 of the gate G1. The inner infrared sensor 42 of the gate G1 also possesses identification information T2, for the surveillance terminal apparatus 10 to identify the detection time information from the inner infrared sensor 42 of the gate G1. Likewise, the outer infrared sensor 41 and the inner infrared sensor 42 of the gates G2 and G3 also possess identification information T3 to T6.

The communication unit 43 of the gate G1 includes an RTC, to identify the time that the detection signal from the outer infrared sensor 41 or the inner infrared sensor 42 has been received, on the basis of the RTC, and transmits output information to the surveillance terminal apparatus 10 through the network 50, the output information being a set of data including first detection time information indicating the detection time of the outer infrared sensor 41 in association with the identification information T1, and second detection time information indicating the detection time of the inner infrared sensor 42 in association with the identification information T2.

The network 50 is a network that enables the communication between the surveillance terminal apparatus 10 and the imaging device 30 or the entry/exit detection device 40, for example a wireless local area network (LAN). Instead, the network 50 may be a wired LAN, a TCP/IP network, or the like.

The surveillance terminal apparatus 10 includes a display unit 12, a touch panel 13, a communication unit 14, a storage unit 15, and a control unit 20. These components are configured to transmit and receive data and signals to and from each other, via a bus.

The display unit 12 is constituted of, for example, a liquid crystal display (LCD) or an organic light-emitting diode (OLED).

The touch panel 13 is based on a resistive film or electrostatic capacitance. The touch panel 13 is located on the screen of the display unit 12, to detect a contact of a finger or an object made on the screen of the display unit 12, along with the contact position. Upon detecting the contact of the finger, the touch panel 13 outputs a detection signal indicating the coordinate position of the contact position, to a controller 21 of the control unit 20. Accordingly, the touch panel 13 serves as an operation unit for inputting the user's operation performed on the screen of the display unit 12.

The surveillance terminal apparatus 10 may also include hard keys as an operation unit for the user to make inputs, in addition to the touch panel 13.

The communication unit 14 is a communication interface including a communication module such as a non-illustrated LAN chip. The communication unit 14 is configured to receive the data of the picture of the gate shot by the imaging device 30, and the output information from the entry/exit detection device 40 that detects the entry and exit of the target person.

The storage unit 15 includes a large-capacity solid state drive (SSD) or hard disk drive (HDD), and contains various data and programs. The storage unit 15 also stores therein the data of the picture of the gate shot by the imaging device 30, received by the communication unit 14. In this embodiment, the storage unit 15 includes a general storage area and a specific storage area, to temporarily store the picture data transmitted from the imaging device 30 in the general storage area, and store the data of the entry picture and the exit picture of the target person in the specific storage area, out of the picture data stored in the general storage area. The general storage area can be erased, either periodically (e.g., once a month or year), or by the instruction of the user. In the storage unit 15, the entry picture data and the exit picture data of the target person may be subsequently saved in the general storage area, instead of providing the specific storage area. Further, the storage unit 15 includes a correspondence information table containing in advance the correspondence information between the gates G1 to G3 shown in FIG. 2, and the identification information T1 to T6 and the identification information C1 to C6, and a management information storage table shown in FIG. 3, which will be subsequently described.

The control unit 20 includes a processor, a random-access memory (RAM), a read-only memory (ROM), and so forth. The processor is, for example, a central processing unit (CPU), a micro-processing unit (MPU), an application specific integrated circuit (ASIC), or the like. The control unit 20 acts, when the processor executes a control program stored in the ROM or the storage unit 15, as the controller 21, a communication controller 22, a picture identifier 23, a reader 24, a playback controller 25, a decider 26, a gate-pass time calculator 27, a facial recognition processor 28, a storage format setter 29, and a picture decider 60. Here, the components of the control unit 20 cited above may each be constituted in the form of a hardware circuit, instead of being performed according to the program.

The controller 21 serves to control the overall operation of the surveillance terminal apparatus 10. The controller 21 is connected to the display unit 12, the touch panel 13, the communication unit 14, and the storage unit 15, to control the operation of the mentioned components, and exchange signals or data among the components.

The communication controller 22 controls the operation of the communication unit 14. The communication controller 22 stores the picture data received by the communication unit 14 from the imaging device 30, in the general storage area of the storage unit 15, and stores the output information from the entry/exit detection device 40 in the management information storage table (see FIG. 3) in the storage unit 15.

The decider 26 decides whether the target person has entered or exited, on the basis of the output information received by the communication unit 14 from the entry/exit detection device 40 (i.e., the first detection time information accompanied with the identification information T1, and the second detection time information accompanied with the identification information T2). More specifically, the decider 26 decides that the information is related to the gate G1 according to the identification information T1 or T2, and then decides whether the information indicates entry or exit through the gate G1, on the basis of the temporal relation between the first detection time information accompanied with the identification information T1, and the second detection time information accompanied with the identification information T2. The decider 26 decides that the target person has entered, when the detection time of the outer infrared sensor 41 indicated by the first detection time information is earlier than the detection time of the inner infrared sensor 42 indicated by the second detection time information, and decides that the target person has exited, in the contrary case. The decision with respect to the remaining gates G2 and G3 is also made similarly to the decision with respect to the gate G1.

The picture identifier 23 identifies, as the entry picture, a part of the picture shot by the imaging device 30 and stored in the storage unit 15, representing the target person included in an entry detection section, identified on the basis of the output information received by the communication unit 14 from the entry/exit detection device 40, and identifies, as the exit picture, a part of the picture shot by the imaging device 30 and stored in the storage unit 15, representing the target person included in an exit detection section, identified on the basis of the output information received by the communication unit 14 from the entry/exit detection device 40.

For example, when the decider 26 decides that the target person has entered through the gate G1, the picture identifier 23 identifies, as the entry picture, a part of the picture shot by the entry imaging unit 31 of the gate G1 and stored in the storage unit 15, corresponding to the entry detection section from the detection time of the outer infrared sensor 41 indicated by the first detection time information to the detection time of the inner infrared sensor 42 indicated by the second detection time information. Likewise, when the decider 26 decides that the target person has exited through the gate G1, the picture identifier 23 identifies, as the exit picture, a part of the picture shot by the exit imaging unit 32 of the gate G1 and stored in the storage unit 15, corresponding to the exit detection section from the detection time of the inner infrared sensor 42 indicated by the second detection time information to the detection time of the outer infrared sensor 41 indicated by the first detection time information. The entry picture and the exit picture of the remaining gates G2 and G3 are also identified, similarly to those of the gate G1.

The gate-pass time calculator 27 calculates a gate-pass time of the entry and the exit of the target person, on the basis of the first detection time information and the second detection time information. Thus, the gate-pass time corresponds to the period between the detection time of the outer infrared sensor 41 indicated by the first detection time information and the detection time of the inner infrared sensor 42 indicated by the second detection time information.

The reader 24 is configured to read out the entry picture and the exit picture identified by the picture identifier 23, from the storage unit 15. For example, the reader 24 reads out, from the storage unit 15, the entry picture and the exit picture identified on the basis of the detection time, the entry/exit flag, the gate number, the picture index, and the gate-pass time recorded in the management information storage table shown in FIG. 3, which will be subsequently described.

The facial recognition processor 28 performs facial recognition with respect to the entry picture and the exit picture read out by the reader 24, to thereby identify both of the entry picture and the exit picture of the same target person.

The facial recognition process refers to a known image recognition process to identify a target person, by extracting features from image data of the face of the target person included in the entry picture and the exit picture, and checking the features against data preserved in advance.

Specifically, the facial recognition processor 28 includes an entry facial recognition information registerer 281 and an exit facial recognition information identifier 282.

The entry facial recognition information registerer 281 extracts the facial recognition information of the target person (e.g., information indicating feature points in the face such as the eyes, the nose, and the mouth, in the face region determined in the image of the target person), on the basis of the image information of the target person in the entry picture read out by the reader 24. The entry facial recognition information registerer 281 then registers the extracted facial recognition information of the target person, and a face-detected person number indicating the face-detected person corresponding to the facial recognition information and allocated in the ascending order, in a collation source data registerer 151 of the storage unit 15 as collation source registration data, and also stores the face-detected person number in the storage unit 15 in association with the entry picture. For example, regarding the control number "1" in the management information storage table shown in FIG. 3, "P001" is entered in the column of the "face-detected person number".

The exit facial recognition information identifier 282 identifies the facial recognition information in the collation source registration data of the collation source data registerer 151, which the facial recognition information of the target person extracted on the basis of the image information of the target person in the exit picture accords with, and stores the face-detected person number that is the same as the face-detected person number of the facial recognition information identified as according, in the storage unit 15 in association with the exit picture. For example, regarding the control number "3" in the management information storage table shown in FIG. 3, "P001" is entered in the column of the "face-detected person number".

The facial recognition processor 28 identifies the entry picture and the exit picture having the same face-detected person number, as the entry picture and the exit picture of the same target person. The facial recognition processor 28 stores the entry picture and the exit picture thus identified, in the specific storage area in the storage unit 15.

Although the facial recognition processor 28 is provided in this embodiment, a recognition processor having a known person recognition function, in addition to the facial recognition function, may be provided. In this case, the person recognition based on the body shape and clothes of the target person is performed, in addition to the facial recognition, and therefore the identification accuracy of the target person can be further improved.

The picture decider 60 decides whether a specific picture content (in this embodiment, an image B of belongings, for example shown in FIG. 8) is included in at least one of the pictures identified by the facial recognition processor 28, through an image analysis process. Although the image B of the belongings is utilized as the specific picture content in this embodiment, an image of a person at a certain post, or a picture representing a suspicious behavior may be employed, without limitation to the image B of the belongings.

The playback controller 25 controls the displaying operation of the display unit 12. For example, the playback controller 25 controls the display unit 12 so as to simultaneously play back both of the entry picture and the exit picture of the same target person identified by the facial recognition processor 28, side by side on the screen of the display unit 12. In addition, when a difference between the respective playback times (e.g., playback duration at the normal speed) of the entry picture and the exit picture of the same target person, corresponding to the actual length of the pictures, exceeds a threshold (e.g., equal to or larger than the threshold), the playback controller 25 changes the playback time of both of the pictures to the same playback time, and causes the display unit 12 to simultaneously play back both of the pictures side by side.

Figure 7:
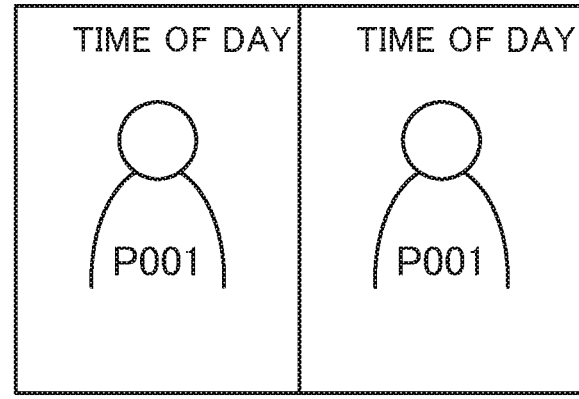
FIG. 7 is a schematic drawing showing an entry picture and an exit picture of the same target person, simultaneously played back side by side, when the target person is without belongings.

Further, in the case where the picture decider 60 decides that the specific picture content (e.g., image of the belongings) is not included, the playback controller 25 changes the playback times of the respective pictures to the first playback time (e.g., 7 seconds) common to the pictures, and causes the display unit 12 to simultaneously play back both of the pictures side by side (see FIG. 7). In contrast, in the case where the picture decider 60 decides that the specific picture content (e.g., image of the belongings) is included, the playback controller 25 changes the playback times of the respective pictures to the second playback time (e.g., 9 seconds) common to the pictures, longer than the first playback time (e.g., 7 seconds), and causes the display unit 12 to simultaneously play back both of the pictures side by side (see FIG. 8).

The storage format setter 29 determines the storage format of the picture data. For example, the storage format setter 29 determines whether to store both of the entry picture and the exit picture of the same target person identified by the facial recognition processor 28, with the changed playback time, in the specific storage area in the storage unit 15. In this embodiment, the storage format setter 29 is configured to store the pictures with the changed playback time. Such a setting may be changed according to an instruction of the user.

The control unit 20 stores the management information of the target person, such as the entry and exit history and a picture index, in the management information storage table in the storage unit 15, on the basis of the picture data from the imaging device 30 stored in the storage unit 15, and the output information from the entry/exit detection device 40. In the management information storage table shown in FIG. 3, the management information including the control number, the detection times, the entry/exit flag, the gate number, the picture index, the gate-pass time, and the face-detected person number is recorded. The storage of the management information is performed at a step of storing the detection time in a simultaneous playback process (S102), a step of processing the entry management information (S104), and a step of processing the exit management information (S105) shown in FIG. 4, each of which will be subsequently described.

Figure 4:
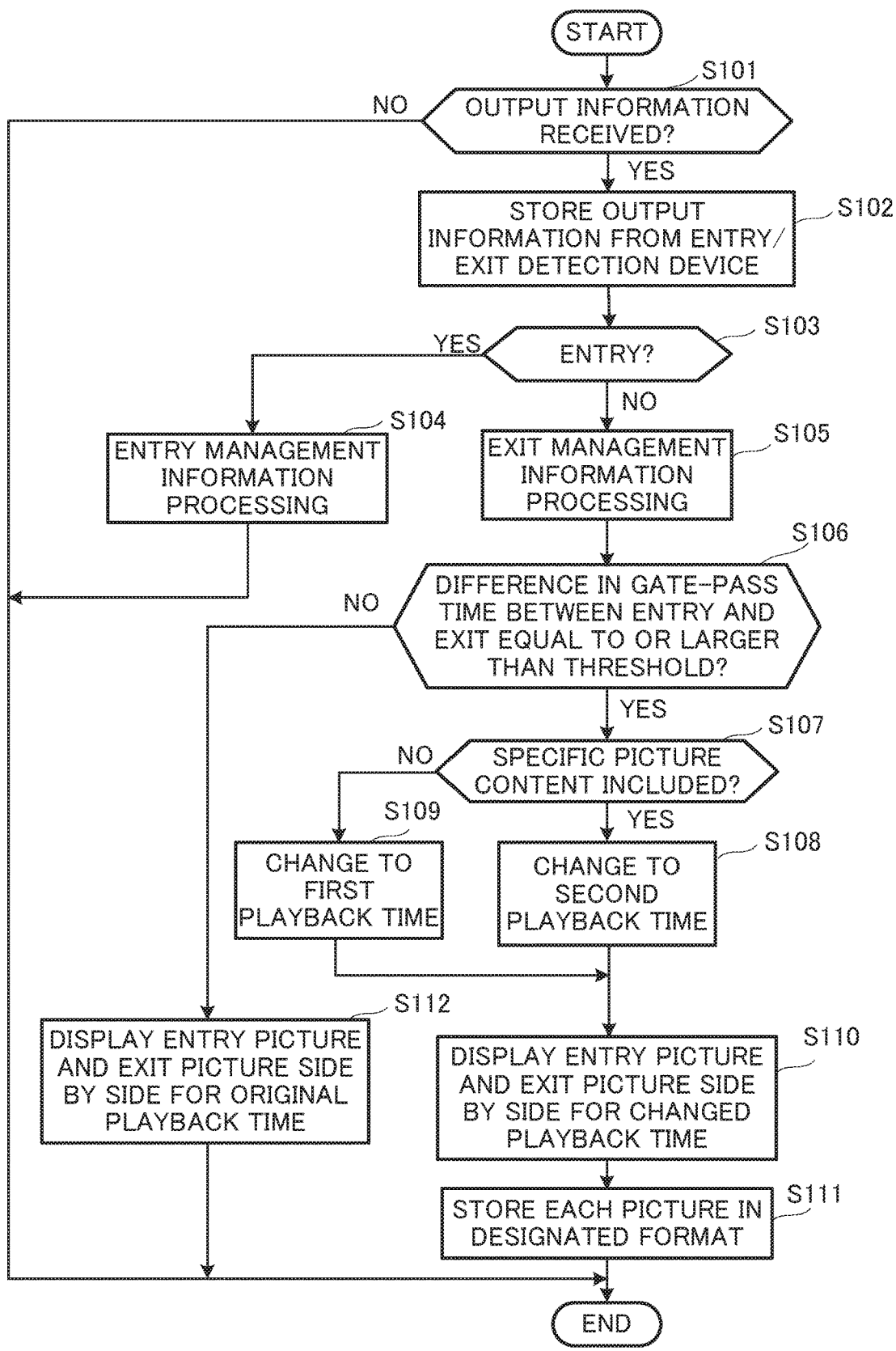
FIG. 4 is a flowchart showing a simultaneous playback process for simultaneously playing back an entry picture and an exit picture side by side, on a display unit of a surveillance terminal apparatus.

Hereunder, description will be given regarding the simultaneous playback process performed by the surveillance terminal apparatus 10 according to this embodiment, to cause the display unit 12 to simultaneously play back both of the entry picture and the exit picture side by side, with reference to the flowchart shown in FIG. 4.

First, the communication controller 22 of the surveillance terminal apparatus 10 decides whether the communication unit 14 has received the output information from the entry/exit detection device 40 (S101). In the case where the communication unit 14 has received the output information (Yes at S101), the communication controller 22 stores the output information (including the first detection time information and the second detection time information) in the management information storage table, as the management information (S102). For example, the communication controller 22 stores the detection time of the outer infrared sensor 41 indicated by the first detection time information accompanied with the identification information T1, and the detection time of the inner infrared sensor 42 indicated by the second detection time information accompanied with the identification information T2, in the column of "detection times" corresponding to the control number "1" in the management information storage table shown in FIG. 3, from the earlier one. In this example, "T1: 08:30:12, T2: 08:30:22" is entered in the column of "detection times" corresponding to the control number "1". In this embodiment, the detection time is expressed in 24-hour notation. In the case where the output information has not been received (No at S101), the operation is finished.

After the output information is stored as the management information (S102), the decider 26 decides whether the target person has entered (S103). More specifically, the decider 26 decides whether the target person has entered or exited, on the basis of the first detection time information accompanied with the identification information T1, and the second detection time information accompanied with the identification information T2 in the output information (the detection times stored in the management information storage table shown in FIG. 3). Regarding the control number "1", for example, the detection time "08:30:12" of the outer infrared sensor 41, indicated by the first detection time information accompanied with the identification information T1, is earlier than the detection time "08:30:22" of the inner infrared sensor 42 indicated by the second detection time information accompanied with the identification information T2. Therefore, the decider 26 decides that the target person has entered. When the decider 26 decides as "entry" (Yes at S103 Yes), the controller 21 performs the entry management information processing (S104).

Figure 5:
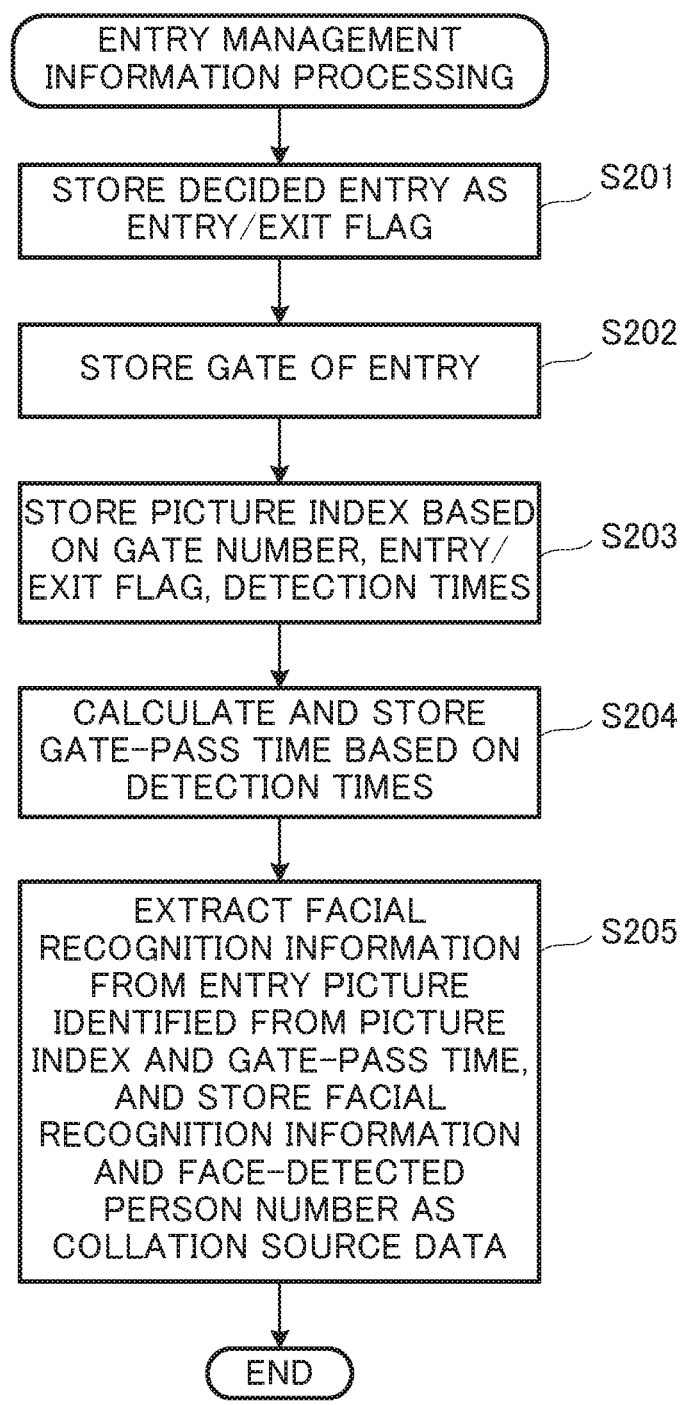
FIG. 5 is a flowchart showing an entry management information processing performed by the surveillance terminal apparatus.

FIG. 5 represents the entry management information processing. In the entry management information processing, the controller 21 stores the "entry" decided by the decider 26 at S103 in the management information storage table, as the entry/exit flag (S201). For example, the term "entry" is entered in the column of the entry/exit flag corresponding to the control number "1", in the management information storage table shown in FIG. 3.

The decider 26 identifies the gate G1 corresponding to the identification information T1 and T2 included in the output information, on the basis of the correspondence information stored in the correspondence information table in the storage unit 15 (indicating the correspondence between the gates G1 to G3 and the identification information T1 to T6 shown in FIG. 2). For example with respect to the control number "1" in the management information storage table shown in FIG. 3, the controller 21 enters "G1" in the column of "gate" corresponding to the control number "1" (S202).

The picture identifier 23 stores the picture index, on the basis of the data in "gate", "entry/exit flag", and "detection times" in the management information storage table (S203). Regarding the control number "1" for example, the picture identifier 23 identifies, because of "gate" indicating the gate G1 and "entry/exit flag" indicating the entry, the entry imaging unit 31 having the identification information C1 corresponding to the data in "gate" and "entry/exit flag", and enters "C1: 08:30:12", which is the combination of the identification information C1 and the detection time "08:30:12" of the outer infrared sensor 41, in the column of "picture index". The picture index represents the starting time of the entry picture of the target person, shot by the entry imaging unit 31 having the identification information C1.

The gate-pass time calculator 27 calculates the gate-pass time for the entry of the target person, on the basis of the first detection time information and the second detection time information. Regarding the control number "1" in FIG. 3 for example, the gate-pass time calculator 27 calculates the gate-pass time, corresponding to the difference between the detection time "08:30:12" of the outer infrared sensor 41 indicated by the first detection time information accompanied with the identification information T1, and the detection time "08:30:22" of the inner infrared sensor 42 indicated by the second detection time information accompanied with the identification information T2, in other words 10 seconds (S204). The gate-pass time calculator 27 then stores the value "10" calculated as above in the column of "gate-pass time" corresponding to the control number "1" in the management information storage table shown in FIG. 3 (S204).

The entry facial recognition information registerer 281 of the facial recognition processor 28 extracts the facial recognition information of the target person, from the image of the target person in the entry picture identified by the picture identifier 23 on the basis of the picture index and the gate-pass time (i.e., the part of the picture shot by the entry imaging unit 31 having the identification information C1, corresponding to the section of the gate-pass time (10 seconds) from the time "08:30:22"). Then the entry facial recognition information registerer 281 registers the extracted facial recognition information and the face-detected person number indicating the face-detected person corresponding to the facial recognition information and allocated in the ascending order, in the collation source data registerer 151 of the storage unit 15 as collation source registration data, and also stores the face-detected person number in the storage unit 15 in association with the entry picture (S205). More specifically, the entry facial recognition information registerer 281 stores a face-detected person number Pn, when the target person is the n-th face-detected person according to the facial recognition information, in the column of "face-detected person number" corresponding to the control number "1" in the management information storage table shown in FIG. 3. For example, since the target person of the control number "1" in the management information storage table shown in FIG. 3 is the first face-detected person according to the facial recognition information, the face-detected person number P001 is allocated. At this point, the operation is finished.

Referring back to FIG. 4, the case where the decider 26 decides as "exit" (No at S103) will be described hereunder. In the following description, the "exit" corresponding to the control number "3" in FIG. 3 will be referred to.

Since the detection time "08:40:25" of the inner infrared sensor 42 indicated by the second detection time information accompanied with the identification information T2 is earlier than the detection time "08:40:30" of the outer infrared sensor 41 indicated by the first detection time information accompanied with the identification information T1, in "detection times" corresponding to the control number "3" in FIG. 3, the decider 26 decides as "exit" (No at S103). The controller 21 performs the exit management information processing (S105).

Figure 6:
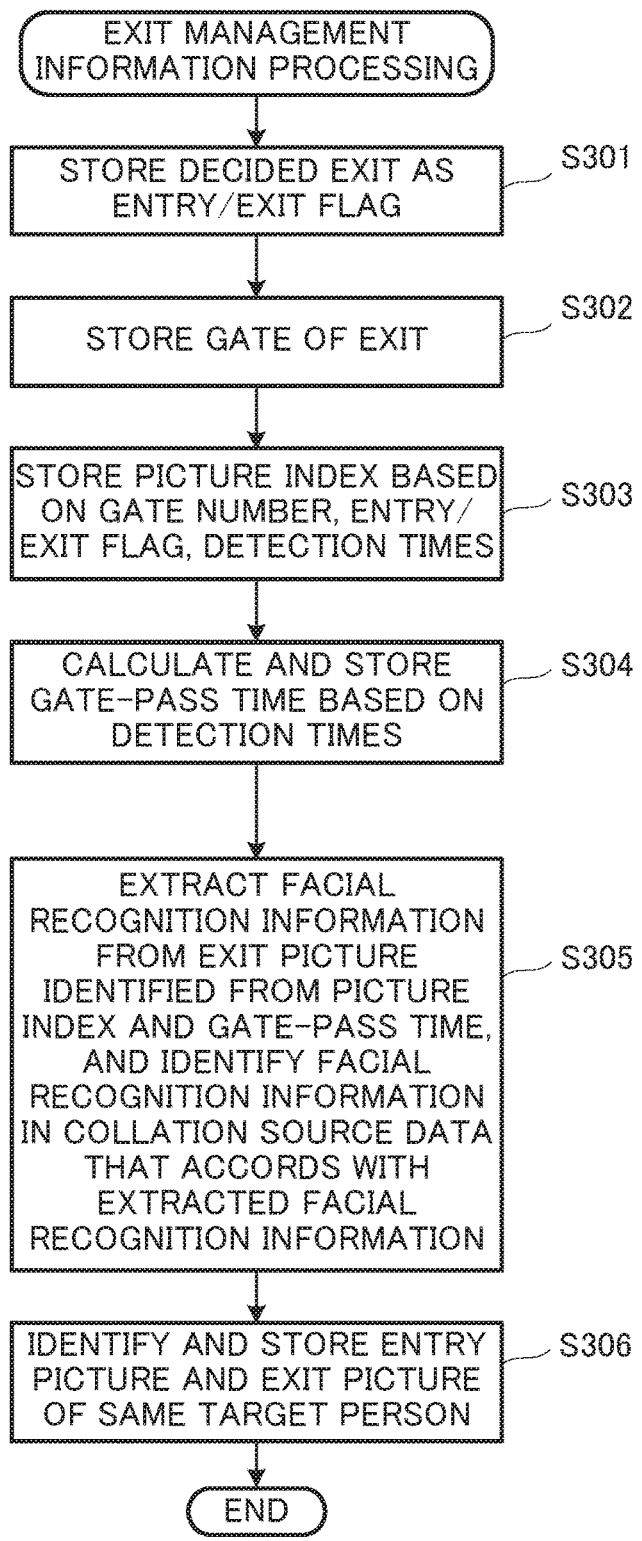
FIG. 6 is a flowchart showing an exit management information processing performed by the surveillance terminal apparatus.

FIG. 6 represents the exit management information processing. In the exit management information processing, the controller 21 stores the "exit" decided by the decider 26 at S103, in the column of "entry/exit flag" in the management information storage table shown in FIG. 3 (S301). The decider 26 then identifies the gate G1 corresponding to the identification information T1 and T2 included in the output information, in other words the identification information T1 and T2 in the detection time stored in the management information storage table. The controller 21 enters "G1" in the column of "gate" corresponding to the control number "3" in the management information storage table shown in FIG. 3 (S302).

The picture identifier 23 stores the picture index, on the basis of the data in the columns of "gate", "entry/exit flag", and "detection times" stored in the management information storage table (S303). Regarding the control number "3" for example, the picture identifier 23 identifies, because of "gate" indicating the gate G1 and "entry/exit flag" indicating the exit, the exit imaging unit 32 having the identification information C2 corresponding to the data in "gate" and "entry/exit flag", and enters "C2: 08:40:25" which is the combination of the identification information C2 and the detection time "08:40:25" of the inner infrared sensor 42, in the column of "picture index". This picture index represents the starting time of the exit picture of the target person, shot by the entry imaging unit 32 having the identification information C2.

The gate-pass time calculator 27 calculates the gate-pass time for the exit of the target person, on the basis of the first detection time information and the second detection time information. Regarding the control number "3" in FIG. 3 for example, the gate-pass time calculator 27 calculates the gate-pass time, corresponding to the difference between the detection time "08:40:25" of the inner infrared sensor 42 indicated by the second detection time information accompanied with the identification information T2, and the detection time "08:40:30" of the outer infrared sensor 41 indicated by the first detection time information accompanied with the identification information T1, in other words 5 seconds (S304). The gate-pass time calculator 27 then stores the value "5" calculated as above in the column of "gate-pass time" corresponding to the control number "3" in the management information storage table shown in FIG. 3.

The exit facial recognition information identifier 282 of the facial recognition processor 28 extracts the facial recognition information of the target person, from the image of the target person in the exit picture identified by the picture identifier 23 on the basis of the picture index and the gate-pass time (i.e., the part of the picture shot by the exit imaging unit 32 having the identification information C2, corresponding to the section of the gate-pass time (5 seconds) from the time "08:40:25"). Then the exit facial recognition information identifier 282 identifies the facial recognition information in the collation source registration data in the collation source data registerer 151 that the extracted facial recognition information accords with, and stores the face-detected person number P001, which is the same as the face-detected person number corresponding to the identified facial recognition information (in this example, the face-detected person number P001 corresponding to the control number "1" in FIG. 3), in the storage unit 15 in association with the exit picture (S305). Thus, the face-detected person number P001, which is the same as the face-detected person number P001 corresponding to the control number "1" in the management information storage table shown in FIG. 3, is entered in the column of "face-detected person number" corresponding to the control number "3".

The facial recognition processor 28 the identifies the entry picture and the exit picture of the same target person, having the same "face-detected person number" in the management information storage table shown in FIG. 3 (i.e., the entry picture corresponding to the control number "1" and the exit picture corresponding to the control number "3", which accord with each other in terms of the face-detected person number P001), and stores the entry picture and the exit picture thus identified in the specific storage area in the storage unit 15 (S306). At this point, the operation is finished.

Referring back to FIG. 4, the playback controller 25 decides whether a difference in gate-pass time between the entry and exit of the same target person is equal to or larger than a threshold (e.g., 5 seconds) (S106). For example, the control numbers "1" and "3" in the management information storage table shown in FIG. 3 respectively correspond to the entry picture and the exit picture of the same target person (having the same face-detected person number P001), the gate-pass time for the entry corresponding to the control number "1" is 10 seconds, and the gate-pass time for the exit corresponding to the control number "3" is 5 seconds. Therefore, it is decided that the difference between the gate-pass times is equal to or larger than the threshold (e.g., 5 seconds).

In the case where the playback controller 25 decides that the difference is equal to or larger than the threshold (e.g., 5 seconds) (Yes at S106), the picture decider 60 decides whether a specific picture content (in this embodiment, the image B of the belongings) is included in the exit picture, out of the entry picture and the exit picture of the same target person identified by the facial recognition processor 28, through an image analysis process (S107). In the case where the picture decider 60 decides that the exit picture includes the specific picture content (Yes at S107), the playback controller 25 changes the respective playback times of the entry picture and the exit picture of the same target person (e.g., the entry picture corresponding to the control number "1" and the exit picture corresponding to the control number "3", which accord with each other in terms of the face-detected person number P001), to a second playback time (e.g., 9 seconds) applied to the case where the target person carries the belongings (S108). In contrast, in the case where the picture decider 60 decides that the specific picture content (image of the belongings) is not included in the exit picture (No at S107), the playback controller 25 changes the playback times of the respective pictures to the first playback time (e.g., 7 seconds) applied to the case where the target person is without the belongings (S109). Here, although it is decided whether the specific picture content (image of the belongings) is included in the exit picture in this embodiment, it may be decided whether the specific picture content is included in at least one of the entry picture and the exit picture.

The playback controller 25 causes the display unit 12 to simultaneously play back, side by side, the entry picture and the exit picture of the same target person identified by the facial recognition processor 28, for the playback time changed from the original playback times of the respective pictures (i.e., 7 seconds without the belongings, and 9 seconds with the belongings) (S110).

Referring to FIG. 7, for example the playback times, in other words the actual lengths, of the entry picture and the exit picture of the same target person (in this example, the target person having the face-detected person number P001) are originally 10 seconds and originally 5 seconds respectively. Thus, since the difference therebetween is equal to or larger than the threshold (5 seconds), the playback times of both of the pictures are changed as above. For example, when the target person in the exit picture is without the belongings (FIG. 7), the playback times of the respective pictures are changed to the first playback time (e.g., 7 seconds), and these pictures are simultaneously played back side by side on the display unit 12. To be more detailed, the playback speed of the entry picture is increased so as to shorten the original playback time of 10 seconds, which is the actual length, to 7 seconds, and the playback speed of the exit picture is decreased so as to extend the original playback time of 5 seconds, which is the actual length, to 7 seconds, so that both of the pictures can be simultaneously played back side by side.

In contrast, when the target person in the exit picture is carrying the belongings (FIG. 8), the playback time is changed to the second playback time (e.g., 9 seconds) longer than the first playback time (e.g., 7 seconds), and these pictures are simultaneously played back side by side on the display unit 12. To be more detailed, the playback speed of the entry picture is increased so as to shorten the original playback time of 10 seconds, which is the actual length, to 9 seconds, and the playback speed of the exit picture is decreased so as to extend the original playback time of 5 seconds, which is the actual length, to 9 seconds, so that both of the pictures can be simultaneously played back side by side. When the specific picture content (image of the belongings) is included, the surveillance has to be performed more closely, because the target person may take away articles. Therefore, the playback times of the respective pictures for the case where the target person is carrying the belongings is made longer (e.g., 9 seconds) than the playback times for the case where the target person is without the belongings (e.g., 7 seconds), so that both of the pictures can be more closely checked, and thus the picture surveillance accuracy can be improved.

In addition, the playback controller 25 causes the display unit 12 to display, as shown in FIG. 7 and FIG. 8, additional information such as the time of day (time of playback, entry time, and exit time) and the facial recognition information (face-detected person number), in each of the entry picture and the exit picture.

The controller 21 stores both of the entry picture and the exit picture of the same target person identified by the facial recognition processor 28, in the specific storage area in the storage unit 15, in the storage format determined by the storage format setter 29 (in this embodiment, with the changed playback time (7 seconds or 9 seconds) (S111). At this point, the operation is finished. Storing thus the pictures with the changed playback time eliminates the need to adjust the duration time when the pictures are played back, thereby enabling both of the pictures to be simultaneously played back for the same playback time.

Referring again to FIG. 4, in the case where the difference in gate-pass time is less than the threshold (e.g., 5 seconds) (No at S106), the playback controller 25 causes the display unit 12 to simultaneously play back, side by side, the entry picture and the exit picture of the same target person identified by the facial recognition processor 28, for the respective original playback times (corresponding to the actual length) (S112). At this point, the operation is finished.

In this embodiment, as described above, when the difference in playback time between the entry picture and the exit picture of the same target person exceeds the threshold, the playback times of the respective pictures are changed to the same playback time, and both of the pictures are simultaneously played back side by side on the display unit 12. Thus, even though the playback times (actual length) of the entry picture and the exit picture of the target person are different from each other, the playback time of both of the pictures can be adjusted to the same length, when the pictures are played back. Therefore, the same period of time for visual check can be secured for both of the pictures, and the pictures can be displayed in an easily recognizable manner, and therefore the burden on the surveillant can be alleviated.

Here, with the existing surveillance system referred to above as background art, although the exit picture and the entry picture can be played back side by side on the display unit, one of the exit picture and the entry picture continues to be played back after the playback of the other is finished, when the playback times (lengths) of the respective pictures are largely different, and therefore the pictures are unable, or difficult, to be compared, which leads to an increased burden on the surveillant.

According to this embodiment, unlike the above, the entry picture and the exit picture of the same target person can be displayed in an easily recognizable manner, even though the playback times of the respective pictures are different from each other, and therefore the burden on the surveillant can be alleviated.

Figure 9:
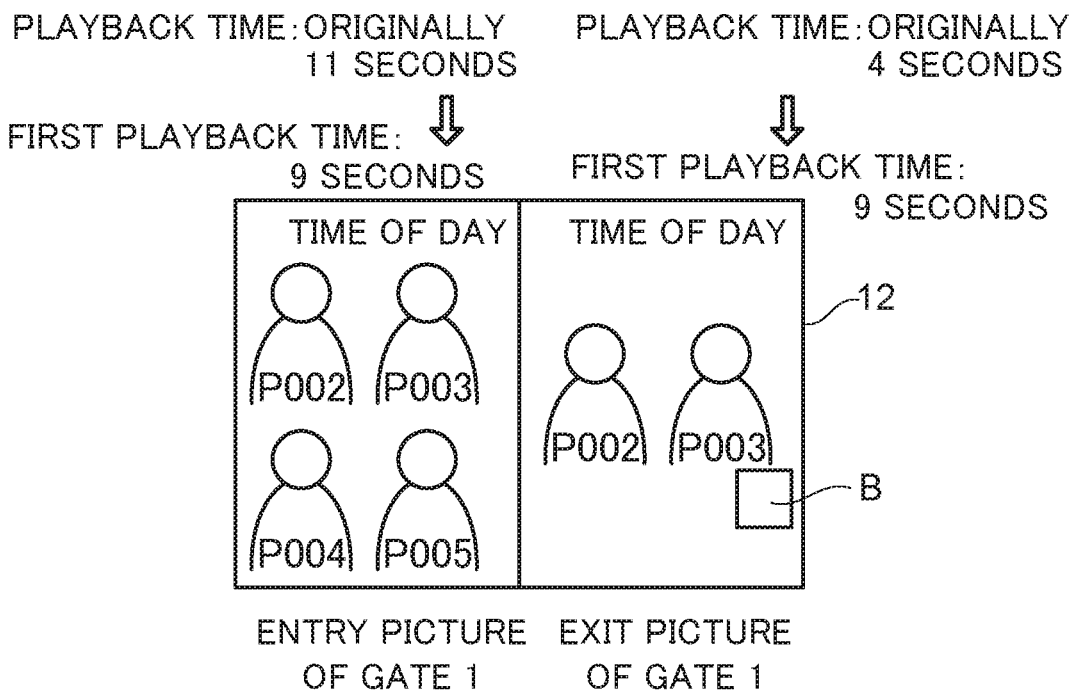
FIG. 9 is a schematic drawing showing an entry picture of four persons who entered at the same time, and an exit picture of two persons out of the four, simultaneously played back side by side, when one of the two persons in the exit picture is carrying belongings.

Hereunder, description will be given regarding the case of simultaneously playing back, side by side, the entry picture of four persons who entered together, and the exit picture of two of them who exited together, as shown in FIG. 9. FIG. 9 represents the case where the target person in the exit picture is carrying the belongings, and the other two persons still remain inside the store.

The management information with respect to the entry picture representing the entry of the four persons is recorded, for example, under the control number "2" in the management information storage table shown in FIG. 3. In the columns corresponding to the control number "2", namely the detection times, the entry/exit flag, the gate number, the picture index, the gate-pass time, and the face-detected person number, "T1: 08:32:44 s, T2: 08:32:55", "entry", "G1", "C1: 08:32:44", "11", and "P002 to P005" are entered, respectively. The mentioned management information is stored in the management information storage table, at the step of storing the detection time (S102), and the step of processing the entry management information (S104) in the simultaneous playback process shown in FIG. 4.

For example, the facial recognition processor 28 performs the facial recognition with respect to the entry picture read out by the reader 24 (in this example, the entry picture corresponding to the control number "2"), to thereby decide whether a plurality of target persons are included in the entry picture, and identifies the entry picture including a plurality of target persons as a multiple entry picture. In this example, the facial recognition processor 28 stores "P002 to P005" in the column of the face-detected person number corresponding to the control number "2" in the management information storage table shown in FIG. 3, and identifies the control number "2" as representing the multiple entry picture.

In addition, the management information with respect to the exit picture representing the two persons who exited together, out of the four in the entry picture, is recorded, for example, under the control number "4" in the management information storage table shown in FIG. 3. In the columns corresponding to the control number "4", namely the detection times, the entry/exit flag, the gate number, the picture index, the gate-pass time, and the face-detected person number, "T6: 08:48:30, T5: 08:48:34", "exit", "G3", "C6: 08:48:30", "4", and "P002, P003" are entered, respectively. The mentioned management information is stored in the management information storage table, at the step of storing the detection time (S102), and the step of processing the exit management information (S105), in the simultaneous playback process shown in FIG. 4.

For example, the facial recognition processor 28 performs the facial recognition with respect to the exit picture read out by the reader 24 (in this example, the exit picture corresponding to the control number "4"), to thereby identify the exit picture including at least one of the plurality of target persons in the multiple entry picture corresponding to the control number "2", as a related exit picture. In this example, the facial recognition processor 28 stores "P002, P003" in the column of the face-detected person number corresponding to the control number "4" in the management information storage table shown in FIG. 3, and identifies the control number "4" as representing the related exit picture.

When the entry picture includes a plurality of target persons, for example when the entry picture identified under the control number "2" in FIG. 3 includes the four target persons respectively having the face-detected person numbers P002 to P005, the reader 24 reads out, from the storage unit 15, the exit pictures including one or a plurality of target persons out of the plurality of target persons in the entry picture (four target persons respectively having the face-detected person numbers P002 to P005), for example the exit picture of the two target persons respectively having the face-detected person numbers P002 and P003 identified under the control number "4" in FIG. 3. In other words, the reader 24 reads out the exit picture including at least one out of the face-detected person numbers of the entry picture. At this point (where the management information of the control number "6" in FIG. 3 has not yet been recorded), the other two persons have not yet exited, and therefore only the exit picture identified under the control number "4" in FIG. 3 is read out.

Now, as shown in FIG. 9, the playback times of the entry picture and the exit picture of the same target person (at least the target persons respectively having the face-detected person numbers P002 and P003) are originally 11 seconds and originally 4 seconds, respectively, and therefore the difference therebetween is larger than the threshold (5 seconds). Accordingly, the playback controller 25 changes the playback times of the respective pictures to the same playback time. For example, as shown in FIG. 9, the target person in the exit picture (corresponding to the face-detected person number P003) is carrying the belongings, and therefore the picture decider 60 decides that the exit picture includes the specific picture content (image B of the belongings). The playback controller 25 changes the playback times of the respective pictures to the second playback time (e.g., 9 seconds) longer than the first playback time (e.g., 7 seconds), and causes the display unit 12 to simultaneously play back, side by side, both of the pictures for the second playback time (e.g., 9 seconds) changed from the original playback time. To be more detailed, the playback speed of the entry picture is increased so as to shorten the original playback time of 11 seconds to 9 seconds, and the playback speed of the exit picture is decreased so as to extend the original playback time of 4 seconds to 9 seconds, so that both of the pictures can be simultaneously played back side by side.

As described above, the playback controller 25 causes the display unit 12 to simultaneously play back, side by side, the multiple entry picture including a plurality (four in the example of FIG. 9) of target persons, and the related exit picture including a part of the four target persons in the multiple entry picture (exit picture of two in the example of FIG. 9), and therefore the multiple entry picture and the related exit picture can be displayed in an easily recognizable manner, even though the playback times of the respective pictures are different from each other, which leads to alleviation of the burden on the surveillant.

Here, the playback controller 25 simultaneously plays back, side by side, the entry picture of the four persons and the exit picture of the two persons out of the four 4, because at this point (where the management information of the control number "6" in FIG. 3 has not yet been recorded) the other two persons have not yet exited. However, in the case where each of the remaining two persons exits apart from the other, the playback controller 25 simultaneously plays back, side by side, the exit picture (e.g., exit picture identified under the control number "6" in FIG. 3 (including the target person having the face-detected person number P005), or the exit picture identified under the control number "7" (including the target person having the face-detected person number P004)), and the entry picture of all the four persons. For example, regarding the exit picture identified under the control number "6" in FIG. 3 (including the target person having the face-detected person number P005), the facial recognition processor 28 identifies, when the management information corresponding to the control number "6" in FIG. 3 is recorded in the management information storage table, the entry picture and the exit picture of the same target person, whose data in the column of "face-detected person number" in the management information storage table partially accords (i.e., the entry picture identified under the control number "2" and the exit picture identified under the control number "6", which accord with each other at least via the face-detected person number P005), and the playback controller 25 simultaneously plays back side by side both of the identified pictures.

Figure 10:
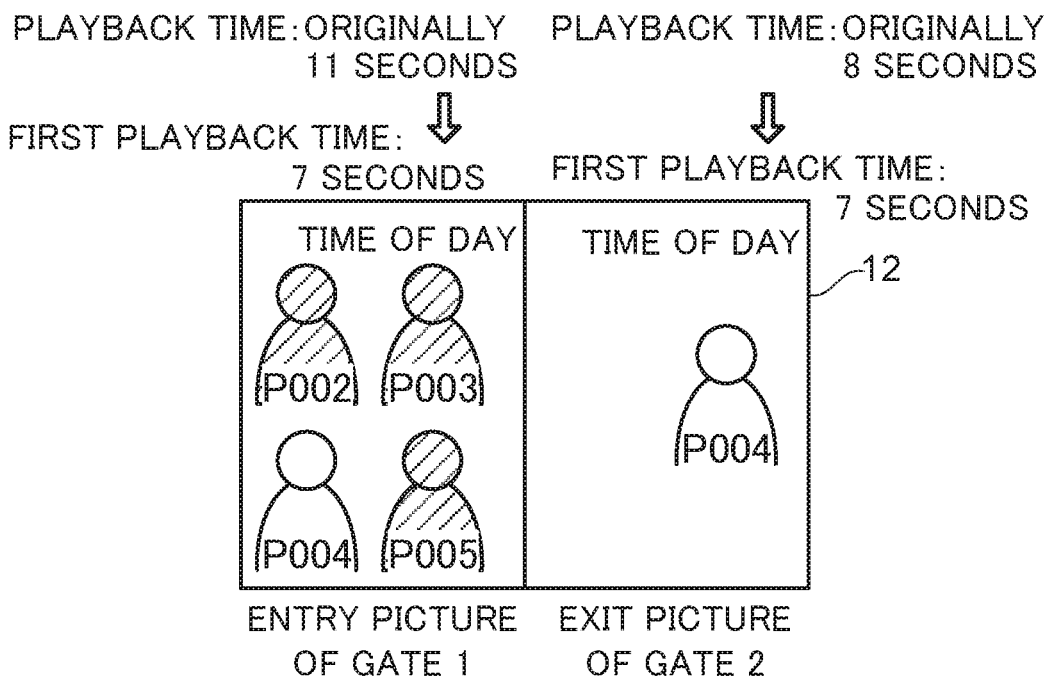
FIG. 10 is a schematic drawing showing an entry picture of four persons who entered at the same time, and an exit picture of a person who has exited last among the four, simultaneously played back side by side.

When the last one exits as shown in FIG. 10, the respective playback times of the entry picture of all the four persons and the exit picture of the target person who has exited last are changed to the same playback time, and these pictures are simultaneously played back side by side. For example, when the target person in the exit picture (having the face-detected person number P004) is without the belongings as shown in FIG. 10, the playback times of the respective pictures are changed to the first playback time (e.g., 7 seconds), and both of the pictures are simultaneously played back side by side, on the display unit 12.

Referring further to FIG. 3, the facial recognition processor 28 identifies, as a succeeding related exit picture, the exit picture including the target person among the plurality of target persons (having the face-detected person numbers P002 to P005) in the multiple entry picture (corresponding to the control number "2"), other than the target persons (having the face-detected person numbers P002 and P003) in the related exit picture (exit picture corresponding to the control number "4"), and shot later than the related exit picture. In FIG. 3, the exit picture corresponding to the control number "6" (including the target person having the face-detected person number P005), and the exit picture corresponding to the control number "7" (including the target person having the face-detected person number P004) are each identified as the succeeding related exit picture. When causing the display unit 12 to display the multiple entry picture and the succeeding related exit picture, the playback controller 25 causes the display unit 12 to display the target persons among the plurality of persons in the multiple entry picture, who are the same as the target persons in the related exit picture, so as to express that those persons already exited.

The target persons among those of the multiple entry picture, who already exited earlier than the target person in the exit picture, are displayed on the display unit 12 so as to express that those persons already exited as shown in FIG. 10, in which the corresponding persons are hatched, and therefore the persons who left earlier than the person in the exit picture can be easily distinguished, when the entry picture including a plurality of target persons and the exit picture of a part of those target persons are simultaneously played back side by side.

When the user operates the touch panel 13 to select one of other target persons in the multiple entry picture shown in FIG. 10 (target person displayed so as to express that this person already exited), the playback controller 25 switches the display to the exit picture of the target person selected by the user, and causes the display unit 12 to simultaneously play back, side by side, the switched exit picture and the entry picture of all the four persons, changing the respective playback times to the same playback time. For example, when one of the target persons in the entry picture having the face-detected person numbers P002 and P003 is selected, the pictures shown in FIG. 9 are simultaneously played back side by side.

Further, after all of the four persons who entered have exited, the playback controller 25 causes the display unit 12 to simultaneously play back, side by side, the entry picture of all the four persons and the exit picture of all of them. For example, the playback controller 25 changes the respective playback times of the entry picture identified under the control number "2", and the three exit pictures respectively corresponding to the control numbers "4", "6", and "7", to the second playback time (e.g., 9 seconds), and simultaneously plays back the mentioned pictures side by side. When the picture decider 60 decides that the exit picture corresponding to the control number "4" includes the specific picture content (image B of the belongings), in other words that the target person having the face-detected person number P003 in FIG. 9 is carrying the belongings, the playback controller 25 changes the playback times to the second playback time. In addition, when the user operates the touch panel 13 to select one of the target persons in the entry picture, the playback controller 25 causes the display unit 12 to simultaneously play back, side by side, the entry picture of all the four persons and exit picture of the target person selected by the user, changing the playback times to the same playback time.

Figure 11:
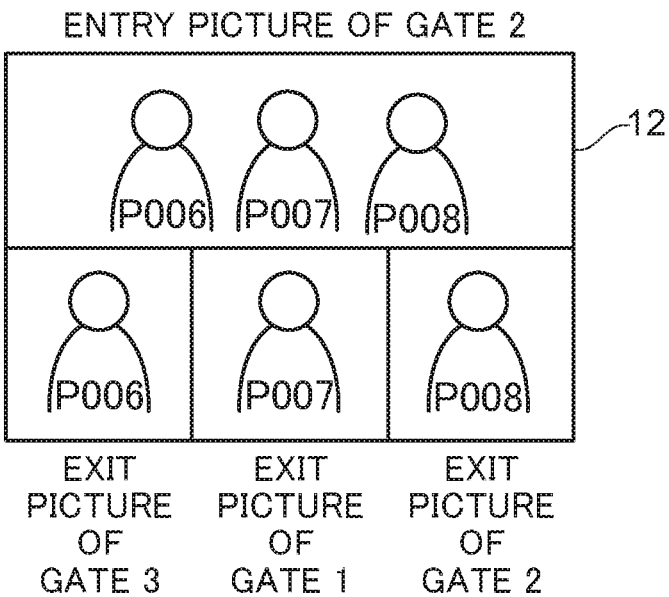
FIG. 11 is a schematic drawing showing an entry picture of three persons who entered at the same time, and respective exit pictures of the three persons, who have exited through different gates, simultaneously played back side by side.

Further, when a plurality (e.g., three) of persons entered together, and the target persons (respectively having the face-detected person numbers P006 to P008) exited through different gates G1 to G3 as shown in FIG. 11, the playback controller 25 causes the display unit 12 to simultaneously play back, side by side, the entry picture of all the three persons and each of the exit pictures of the gates G1 to G3. More specifically, the playback controller 25 causes the display unit 12 to simultaneously play back, side by side, the entry picture of the target persons respectively having the face-detected person numbers P006 to P008, the exit picture of the target person having the face-detected person number P006, who exited through the gate G3, the exit picture of the target person having the face-detected person number P007, who exited through the gate G1, and the exit picture of the target person having the face-detected person number P008, who exited through the gate G2.

Although the surveillance terminal apparatus 10 according to the foregoing embodiment includes the facial recognition processor 28, the surveillance terminal apparatus 10 may include, in place of the facial recognition processor 28, an identification information reading unit that reads identification information on an ID card owned by a target person, each time the target person enters and exits. The identification information reading unit may store the identification information read at the time of entry or exit in the storage unit 15, instead of the face-detected person number shown in FIG. 3, and the controller 21 may identify the entry picture and the exit picture, on the basis of the identification information.

The display method performed by the surveillance terminal apparatus 10 according to the foregoing embodiment may be provided in the form of a program. The program may be recorded on a non-transitory computer-readable recording medium, such as a hard disk, a CD-ROM, a DVD-ROM, or a semiconductor memory. In this case, the non-transitory computer-readable recording medium having the program recorded thereon constitutes an embodiment of the disclosure.

While the present disclosure has been described in detail with reference to the embodiments thereof, it would be apparent to those skilled in the art the various changes and modifications may be made therein within the scope defined by the appended claims.

What is claimed is:

1. A surveillance terminal apparatus comprising:
   a storage unit that stores therein a picture of a gate through which a target person passes when entering or exiting, the picture having been shot by an imaging device;
   a communication unit that receives output information from an entry/exit detection device that detects entry and exit of the target person;
   a display unit; and
   a control unit that includes a processor and acts, when the processor executes a control program, as:
   a picture identifier that identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device received by the communication unit;
   a reader that reads out the entry picture and the exit picture identified by the picture identifier, from the storage unit;
   a facial recognition processor that identifies both of the entry picture and the exit picture of the same target person, by performing facial recognition with respect to the entry picture and the exit picture read out by the reader;
   a gate-pass time calculator that respectively calculates a gate-pass time for entry of the target person and a gate-pass time for exit of the target person, the gate-pass time for entry being equal to an actual length of the entry picture in both of the pictures identified by the facial recognition processor, and the gate-pass time for exit being equal to an actual length of the exit picture in both of the pictures; and
   a playback controller that decides whether a difference between the gate-pass time for entry and the gate-pass time for exit exceeds a threshold, when deciding that the difference exceeds the threshold, by decreasing playback speed of a picture, being one of both of the pictures and having shorter playback time, to be slower than normal speed so as to extend the playback time of the picture having shorter playback time to a changed playback time and by increasing playback speed of a picture, being one of both of the pictures and having longer playback time, to be faster than the normal speed so as to shorten the playback time of the picture having longer playback time to the changed playback time, changes playback times of the respective pictures to the same changed playback time, and causes the display unit to start simultaneously playing back both of the pictures side by side, to thereby cause both of the pictures to be simultaneously played back at the same changed playback time.

2. The surveillance terminal apparatus according to claim 1, wherein
   when the processor executes the control program, the control unit further acts as:
   a picture decider that decides whether at least one of the pictures identified by the facial recognition processor includes a specific picture content, through an image analysis process,
   when the picture decider decides that the specific picture content is not included, by decreasing playback speed of a picture, being one of both of the pictures and having shorter playback time, to be slower than the normal speed so as to extend the playback time of the picture having shorter playback time to a first playback time that has been changed and by increasing playback speed of a picture, being one of both of the pictures and having longer playback time, to be faster than the normal speed so as to shorten the playback time of the picture having longer playback time to the first playback time that has been changed, the playback controller changes the playback times of the respective pictures to the same first playback time that has been changed, and causes the display unit to start simultaneously playing back both of the pictures side by side, to thereby cause both of the pictures to be simultaneously played back at the same first playback time that has been changed, and when the picture decider decides that the specific picture content is included, by decreasing playback speed of a picture, being one of both of the pictures and having shorter playback time, to be slower than the normal speed so as to extend the playback time of the picture having shorter playback time to a second playback time that has been changed, the second playback time being longer than the first playback time, and by increasing playback speed of a picture, being one of both of the pictures and having longer playback time, to be faster than the normal speed so as to shorten the playback time of the picture having longer playback time to the second playback time that has been changed, the playback controller changes the playback times of the respective pictures to the same second playback time that has been changed, and causes the display unit to start simultaneously playing back both of the pictures side by side, to thereby cause both of the pictures to be simultaneously played back at the same second playback time that has been changed.

3. The surveillance terminal apparatus according to claim 1, wherein
   when the processor executes the control program, the control unit further acts as:
   a storage format setter that determines whether to store both of the pictures identified by the facial recognition processor in the storage unit, with the playback time that has been changed.

4. The surveillance terminal apparatus according to claim 1,
wherein the facial recognition processor decides whether a plurality of target persons are included in the entry picture, by performing facial recognition with respect to the entry picture and the exit picture read out by the reader, identifies the entry picture including a plurality of target persons as a multiple entry picture, and identifies, as a related exit picture, the exit picture including at least one of the plurality of target persons in the multiple entry picture, and when a difference in playback time corresponding to an actual length between the multiple entry picture and the related exit picture identified by the facial recognition processor exceeds a threshold, the playback controller, by decreasing playback speed of a picture, being one of both of the pictures and having shorter playback time, to be slower than the normal speed so as to extend the playback time of the picture having shorter playback time to the changed playback time and by increasing playback speed of a picture, being one of both of the pictures and having longer playback time, to be faster than the normal speed so as to shorten the playback time of the picture having longer playback time to the changed playback time, changes the playback times of the respective pictures to the same changed playback time, and causes the display unit to start simultaneously playing back both of the pictures side by side, to thereby cause both of the pictures to be simultaneously played back at the same changed playback time.

5. The surveillance terminal apparatus according to claim 4,
wherein the facial recognition processor identifies, as a succeeding related exit picture, the exit picture including the target person among the plurality of target persons in the multiple entry picture, other than the target persons in the related exit picture, and shot later than the related exit picture, and when causing the display unit to display the multiple entry picture and the succeeding related exit picture, the playback controller causes the display unit to display an image of the target person among the plurality of persons in the multiple entry picture who is the same as the target person in the related exit picture, in a display mode expressing that the same target person already exited.

6. The surveillance terminal apparatus according to claim 5, further comprising an operation unit for a user to make inputs through a screen of the display unit,
wherein, when the user operates the operation unit to select one of other target persons among the plurality of target persons in the multiple entry picture, the other target persons being displayed so as to express that the target persons already exited, the playback controller switches the display to the exit picture of the one other target person, and, by decreasing playback speed of a picture, being one of the multiple entry picture and the exit picture of the one other target person and having shorter playback time, to be slower than the normal speed so as to extend the playback time of the picture having shorter playback time to the changed playback time and by increasing playback speed of a picture, being one of both of the pictures and having longer playback time, to be faster than the normal speed so as to shorten the playback time of the picture having longer playback time to the changed playback time, changes the playback times of the multiple entry picture and the switched exit picture of the one other target person to the same changed playback time, and causes the display unit to start simultaneously playing back both of the pictures side by side, to thereby cause both of the pictures to be simultaneously played back at the same changed playback time.

7. The surveillance terminal apparatus according to claim 1,
wherein the facial recognition processor includes:
an entry facial recognition information registerer that extracts facial recognition information of the target person, on a basis of image information of the target person in the entry picture, registers the extracted facial recognition information of the target person in a collation source data registerer in the storage unit, as collation source registration data, and stores the facial recognition information in the storage unit in association with the entry picture; and
an exit facial recognition information identifier that identifies the facial recognition information in the collation source registration data in the collation source data registerer that the facial recognition information of the target person extracted on a basis of the image information of the target person in the exit picture accords with, and stores the identified facial recognition information in the storage unit in association with the exit picture,
wherein the picture identifier identifies, as the entry picture and the exit picture of the same target person, the entry picture and the exit picture associated with the facial recognition information that accords with the facial recognition information of the target person in the entry picture.

8. A surveillance system comprising:
an imaging device that shoots a gate through which a target person passes when entering or exiting;
an entry/exit detection device that detects entry and exit of the target person; and
a surveillance terminal apparatus that causes a display unit to display a picture of the target person shot by the imaging device, the surveillance terminal apparatus including:
a storage unit that stores therein a picture shot by the imaging device;
a communication unit receives output information from the entry/exit detection device; and
a control unit that includes a processor and acts, when the processor executes a control program, as:
a picture identifier that identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device received by the communication unit;
a reader that reads out the entry picture and the exit picture identified by the picture identifier, from the storage unit;
a facial recognition processor that identifies both of the entry picture and the exit picture of the same target person, by performing facial recognition with respect to the entry picture and the exit picture read out by the reader;

a gate-pass time calculator that respectively calculates a gate-pass time for entry of the target person and a gate-pass time for exit of the target person, the gate-pass time for entry being equal to an actual length of the entry picture in both of the pictures identified by the facial recognition processor, and the gate-pass time for exit being equal to an actual length of the exit picture in both of the pictures; and a playback controller that decides whether a difference between the gate-pass time for entry and the gate-pass time for exit exceeds a threshold, when deciding that the difference exceeds the threshold, by decreasing playback speed of a picture, being one of both of the pictures and having shorter playback time, to be slower than normal speed so as to extend the playback time of the picture having shorter playback time to a changed playback time and by increasing playback speed of a picture, being one of both of the pictures and having longer playback time, to be faster than the normal speed so as to shorten the playback time of the picture having longer playback time to the changed playback time, changes playback times of the respective pictures to the same changed playback time, and causes the display unit to start simultaneously playing back both of the pictures side by side, to thereby cause both of the pictures to be simultaneously played back at the same changed playback time.

9. The surveillance system according to claim 8, wherein the imaging device includes:

an entry imaging unit that shoots the entry picture of the target person entering through the gate; and an exit imaging unit that shoots the exit picture of the target person exiting through the gate, the entry/exit detection device includes:

a first detection unit that detects the target person located at a position on an outer side of the gate; and a second detection unit that detects the target person located at a position on an inner side of the gate, and outputs, as the output information, first detection time information indicating a detection time of the first detection unit, and second detection time information indicating a detection time of the second detection unit, to the communication unit of the surveillance terminal apparatus, the surveillance terminal apparatus includes a decider that decides whether the target person has entered or exited, on a basis of the first detection time information and the second detection time information received by the communication unit, and the picture identifier identifies, as the entry picture, a part of the picture shot by the entry imaging unit and stored in the storage unit, corresponding to a section from the detection time indicated by the first detection time information to the detection time indicated by the second detection time information, when the decider decides as entry, and identifies, as the exit picture, a part of the picture shot by the exit imaging unit and stored in the storage unit, corresponding to a section from the detection time indicated by the second detection time information to the detection time indicated by the first detection time information, when the decider decides as exit.

10. A non-transitory computer-readable recording medium having a surveillance display control program recorded thereon, the surveillance display control program being configured to cause a computer including a processor to act, when the processor executes the surveillance display control program, as:

a control unit that stores, in a storage unit, a picture of a gate through which a target person passes when entering or exiting, the picture having been shot by an imaging device;

a picture identifier that identifies, as an entry picture, a part of the picture stored in the storage unit representing the target person included in an entry detection section, the target person being identified on a basis of output information from an entry/exit detection device that detects entry and exit of the target person, and identifies, as an exit picture, a part of the picture stored in the storage unit representing the target person included in an exit detection section, the target person being identified on a basis of the output information from the entry/exit detection device;

a reader that reads out the entry picture and the exit picture identified by the picture identifier, from the storage unit;

a facial recognition processor that identifies both of the entry picture and the exit picture of the same target person, by performing facial recognition with respect to the entry picture and the exit picture read out by the reader;

a gate-pass time calculator that respectively calculates a gate-pass time for entry of the target person and a gate-pass time for exit of the target person, the gate-pass time for entry being equal to an actual length of the entry picture in both of the pictures identified by the facial recognition processor, and the gate-pass time for exit being equal to an actual length of the exit picture in both of the pictures; and a playback controller that decides whether a difference between the gate-pass time for entry and the gate-pass time for exit exceeds a threshold, when deciding that the difference exceeds the threshold, by decreasing playback speed of a picture, being one of both of the pictures and having shorter playback time, to be slower than normal speed so as to extend the playback time of the picture having shorter playback time to a changed playback time and by increasing playback speed of a picture, being one of both of the pictures and having longer playback time, to be faster than the normal speed so as to shorten the playback time of the picture having longer playback time to the changed playback time, changes playback times of the respective pictures to the same changed playback time, and causes a display unit to start simultaneously playing back both of the pictures side by side, to thereby cause both of the pictures to be simultaneously played back at the same changed playback time.

* * * * *